(12) United States Patent
Oda et al.

(10) Patent No.: US 6,743,270 B2
(45) Date of Patent: Jun. 1, 2004

(54) FILTER AND MANUFACTURING METHOD THEREOF

(75) Inventors: Kouichi Oda, Kariya (JP); Minoru Honda, Kariya (JP); Takanari Takagaki, Kariya (JP)

(73) Assignee: Toyoda Boshoku Corporation, Kariya (JP)

( * ) Notice: Subject to any disclaimer, the term of this patent is extended or adjusted under 35 U.S.C. 154(b) by 221 days.

(21) Appl. No.: 10/014,557

(22) Filed: Dec. 14, 2001

(65) Prior Publication Data

US 2002/0073662 A1 Jun. 20, 2002

(30) Foreign Application Priority Data

Dec. 20, 2000 (JP) ........................................ 2000-387906

(51) Int. Cl.$^7$ .............................. B01D 46/02; D04H 3/16
(52) U.S. Cl. ...................... 55/341.1; 55/385.3; 55/514; 55/521; 55/525; 55/527; 55/DIG. 5; 156/167; 156/242; 210/490; 210/497.01; 264/112; 264/255; 264/257; 427/180; 427/244
(58) Field of Search ................................. 55/341.1, 361, 55/341.2, 378, DIG. 5, 381, 514, 521, 522, 527, 529, 385.3, 525; 156/156, 167, 242; 210/490, 497.01; 264/112, 255, 257; 427/180, 244

(56) References Cited

U.S. PATENT DOCUMENTS 5,271,883 A * 12/1993 Timmons et al. ............... 264/6
5,674,302 A * 10/1997 Nakayama et al. ........... 55/521
5,851,250 A * 12/1998 Sugie et al. .................. 55/529
6,183,530 B1 * 2/2001 Herding et al. ............... 55/522
6,454,827 B2 * 9/2002 Takagaki et al. ............ 156/167

FOREIGN PATENT DOCUMENTS

| DE | 27 36 433 A1 | 2/1979 |
| EP | 0 783 914 A1 | 7/1997 |
| EP | 0 804 958 A1 | 11/1997 |
| JP | A 8-38834 | 2/1996 |
| JP | A 10-128020 | 5/1998 |
| WO | WO 00 24497 A1 | 5/2000 |

OTHER PUBLICATIONS

Machine Translation of JP A 08–38834 from the Japanese Intellectual Property Digital Library Home Page. JP A 08–38834 is dated Feb. 13, 1996.*

Abstracted Publication No. DE 27 36 433 A has a Derwent Access No. of 1979–14402B. DE 27 36 433 A is dated Feb. 15, 1979.*

* cited by examiner

*Primary Examiner*—David A. Reifsnyder
(74) *Attorney, Agent, or Firm*—Oliff & Berridge, PLC

(57) ABSTRACT

A filter portion of a filter includes a plurality of bag-like members. The bag-like members are formed in a container shape having an opening and disposed with intervals therebetween. The periphery of the opening of each bag-like member is supported by a supporting member, and the bag-like members are mutually connected by the supporting member. Consequently, the strength of the filter portion comprising the bag-like members is improved.

7 Claims, 4 Drawing Sheets

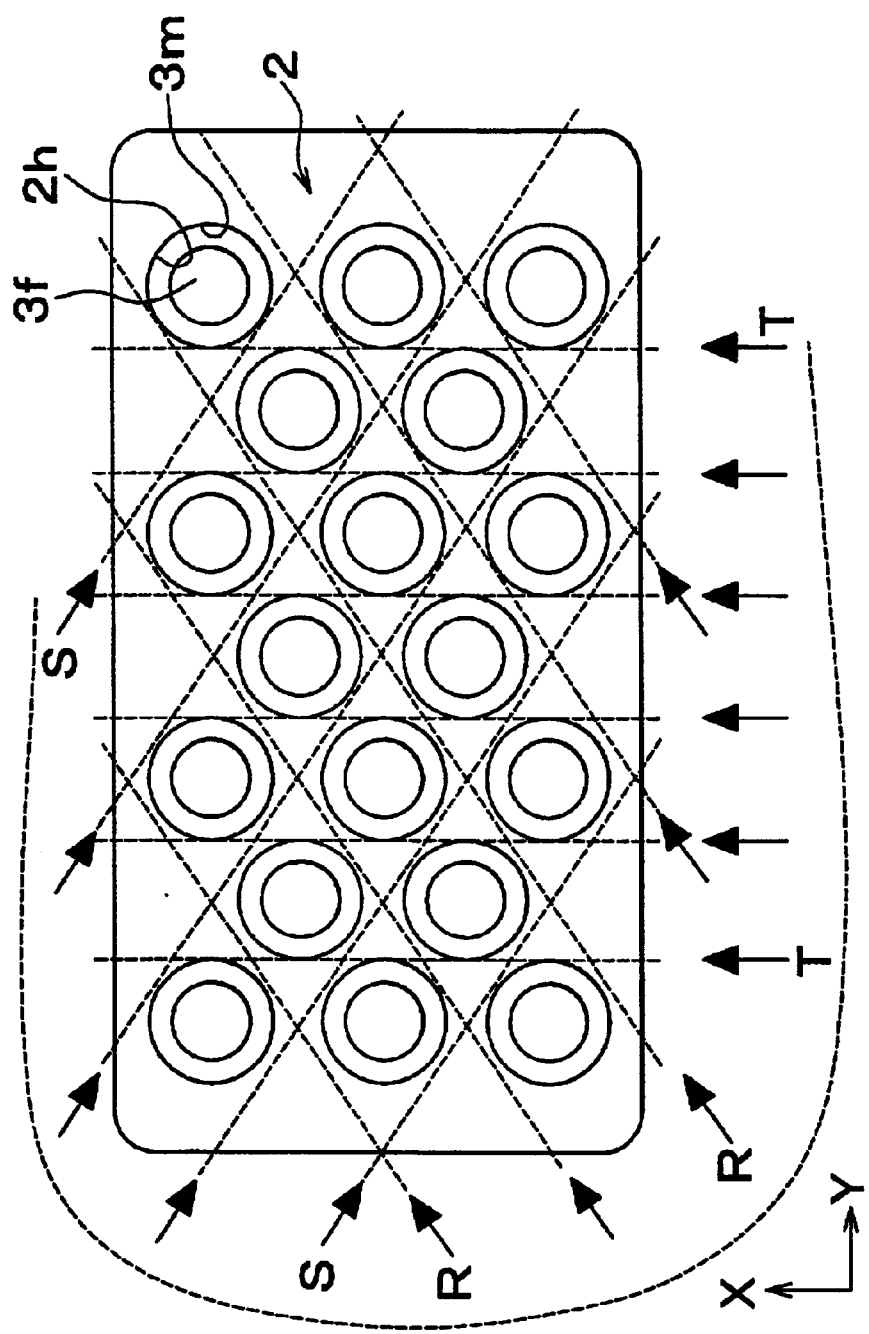

FILTER AND MANUFACTURING METHOD THEREOF

BACKGROUND OF THE INVENTION

1. Field of Invention

The invention relates to a filter whose filter portion has a plurality of bag-like members and a manufacturing method of the filter.

2. Description of Related Art

A schematic drawing of a general filter for an internal combustion engine is shown in FIG. 4. A filter 50 consists of a filter portion 52 for filtering fluid and a flange portion 55 formed at the periphery of the filter portion 52. The filter portion 52 comprises a bellows-type wavy board 53 and a side wall board 54 connected to each side of the wavy board 53. The bellows-type wavy board 53 and side wall boards 54 constitute a series of multiple bag-like members F, with generally triangular sections.

The bag-like members F are susceptible to deformation in a direction (Y direction) orthogonal to a folding line S because the bag-like members F are formed by the wavy boards 53.

SUMMARY OF THE INVENTION

The invention thus provides a filter with a filter portion which does not easily deform by improving the strength of the filter.

A first exemplary aspect of the invention is a filter in which the filter portion comprises a plurality of bag-like members. The bag-like member is formed in a container shape having an opening and the bag-like members are all disposed with intervals therebetween. The periphery of the opening of the bag-like member is supported by a supporting member which interconnects each of the bag-like members.

According to the first exemplary aspect, the bag-like members are disposed with intervals therebetween, and the periphery of the opening of each bag-like member is supported by the supporting member.

In the aforementioned exemplary aspect, the bag-like member may be formed such that a centerline thereof is orthogonal to the opening and the shape of the section parallel to the opening forms a circle or polygon. This prevents the bag-like member from deforming easily due to the fluid passing therethrough and enables a filtering efficiency drop caused by adhesion of adjacent bag-like members to be suppressed.

Also in the exemplary aspect stated above, the supporting member may be formed such that, on a plane surface of the supporting member, a plurality of straight lines that traverse the supporting member exist thereon without interfering with any of the bag-like members, and each straight line intersects with the other straight lines in at least one place each. By doing so, the straight lines function as a framework (beams) that connects the edges of the supporting member, thereby increasing the strength of the supporting member.

A second exemplary aspect of the invention is a method for manufacturing the filter explained in the aforementioned exemplary aspect. The manufacturing method comprises a step of preparing a forming die having a forming surface formed in a shape almost identical to that of one side of the filter and a step of laminating fibers over the forming surface of the forming die. This method facilitates the manufacturing of the filter explained in the aspect above.

BRIEF DESCRIPTION OF THE DRAWINGS

The above mentioned and other objects, features, advantages, and technical industrial significance of this invention will be better understood by reading the following detailed description of the preferred embodiments of the invention, when considered in connection with the accompanied drawings, in which:

FIG. 2 is a plan view of the filter;

DETAILED DESCRIPTION OF PREFERRED EMBODIMENTS

Figure 1:
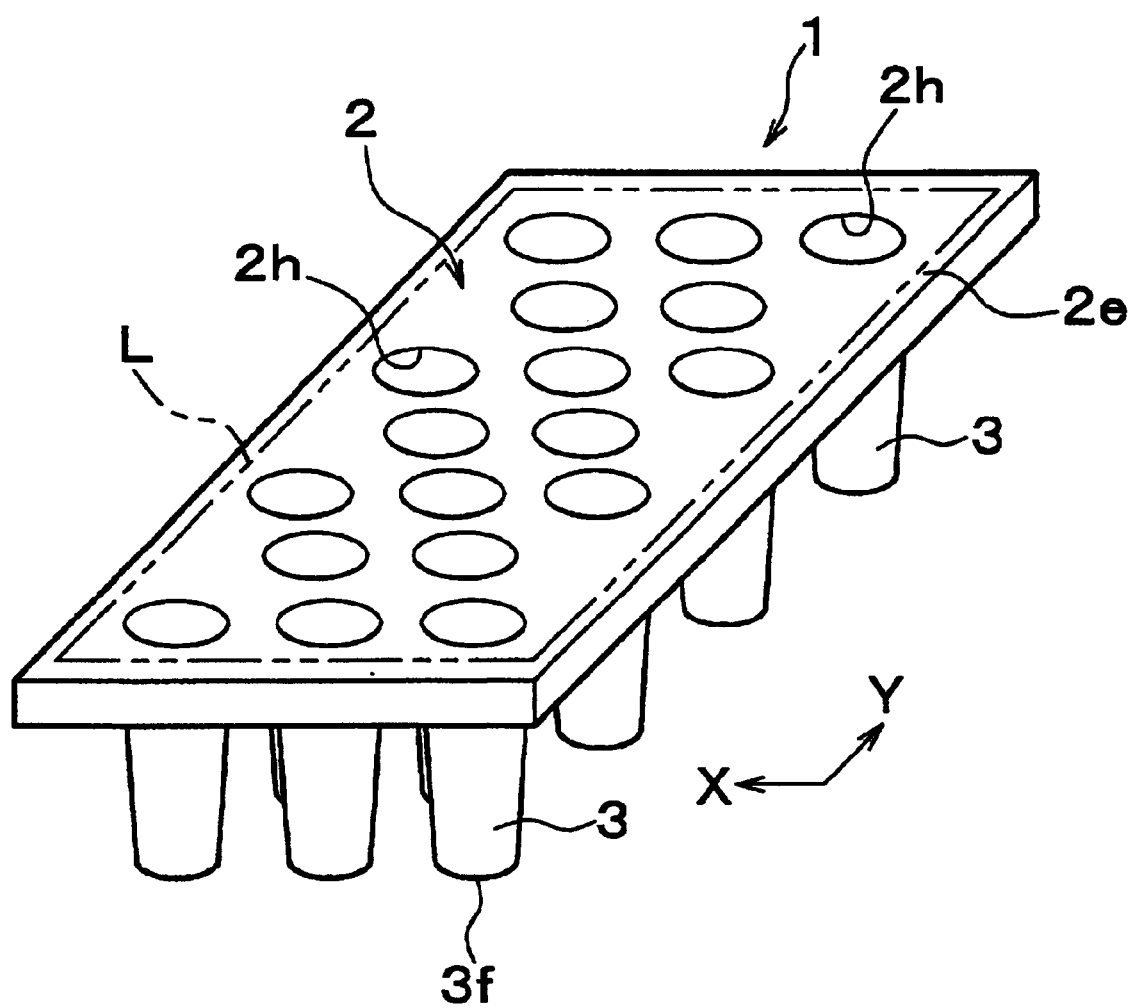
FIG. 1 is a perspective view of a filter according to a first embodiment of the invention.
Figure 3A:
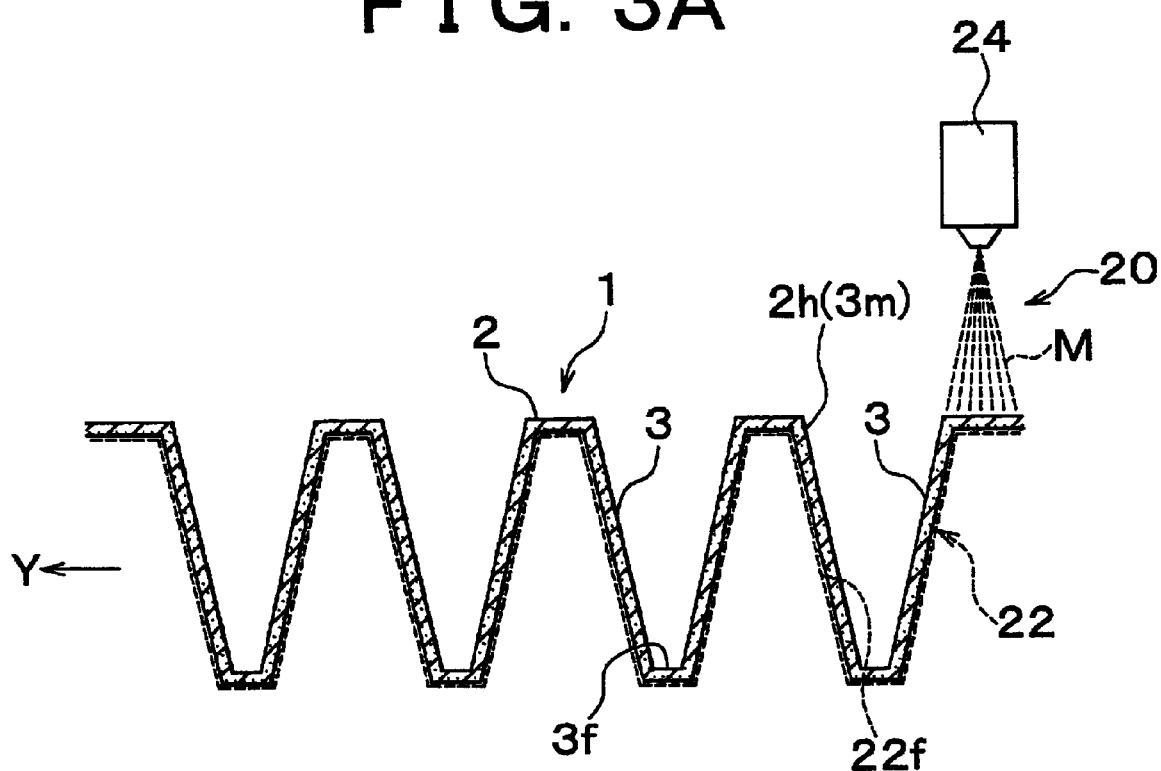
FIG. 3A is a schematic view showing a manufacturing method of the filter.
Figure 3B:
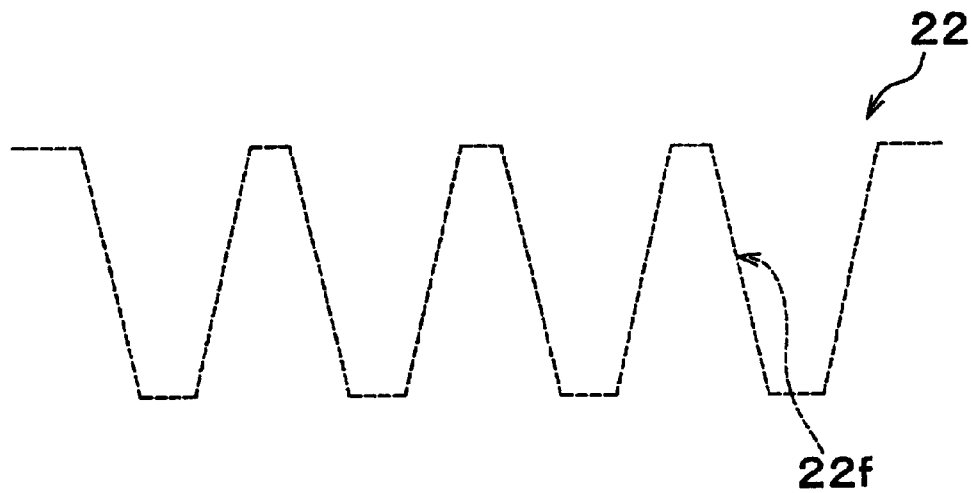
FIG. 3B is a longitudinal sectional view of a forming die of the filter.
Figure 4:
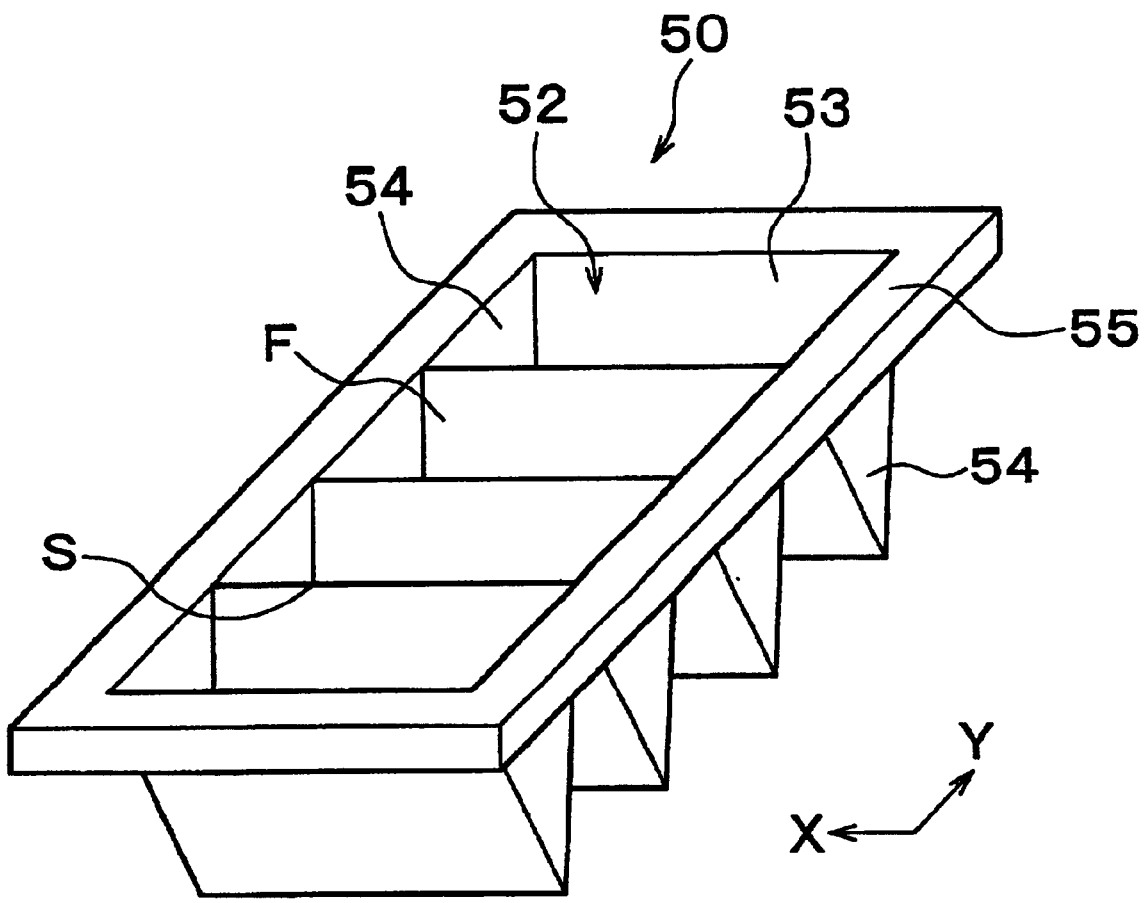
FIG. 4 is a perspective view of a conventional filter.

Hereinafter, a filter according to a first embodiment of the invention and a manufacturing method of such a filter will be described referring to FIGS. 1 to 3. FIG. 1 is a perspective view of a filter according to the first embodiment and FIG. 2 is a plan view of the filter. FIG. 3A is a schematic view showing a manufacturing method of the filter, and FIG. 3B is a schematic view showing a forming die used in manufacturing the filter.

As shown in FIG. 1, a filter 1 according to the first embodiment comprises a flat plate member 2 and a plurality of bag-like members 3 connected to the flat plate member. The flat plate member 2 is made of nonwoven fabric and formed, for example, in a rectangular shape, and a through-hole 2h is formed at a location where the bag-like member 3 is connected.

The periphery 2e (the outer side of the alternate long and two short dashed line L in FIG. 1) of the flat plate member 2 is used as a flange portion when the filter 1 is set in a housing (not shown in the drawing), and the portion other than the periphery 2e is used as a filter portion for filtering fluid. Hereinafter the periphery 2e of the flat plate member 2 will be referred to as a flange portion 2e.

The bag-like member 3, which constitutes the filter portion just like the flat plate member 2, is made of nonwoven fabric and formed, for example, in a tapered cylindrical shape. The tip of the bag-like member 3 is covered with a disc cap 3f and an opening 3m is provided at the base end of the bag-like member 3. That is, the bag-like member 3 is formed such that a centerline thereof is orthogonal to an opening 3m and the shape of the section parallel to the opening 3m forms a circle. Further, the opening 3m of the bag-like member 3 is connected to the through-hole 2h of the flat plate member 2. Accordingly, the bag-like member 3 is supported from the periphery by the flat plate member 2 at the position of the opening 3m and bag-like members 3 are connected with each other by the flat plate member 2. That is, the flat plate member 2 stated above functions as the supporting member of the invention.

As shown in FIG. 2, the aforementioned filter 1 has 18 bag-like members 3 disposed with intervals therebetween on the flat plate member 2. The location of each bag-like member 3 is set as follows. First, imaginary straight lines R, S and T (refer to the dotted lines) that traverse the flat plate member 2 are drawn in a mesh on the flat plate member 2. Then, without interfering with the imaginary straight lines R, S and T, a bag-like member 3 is located within the mesh eyes created by the imaginary straight lines R, S and T.

In other words, on the flat plate member 2 exist the straight lines R, S and T (refer to the dotted lines) that can traverse the flat plate member 2 without interfering with any of the bag-like members 3, and each straight line R, S and T intersects with the other straight lines in at least one place each.

Accordingly, when the periphery 2e (flange portion 2e) of the flat plate member 2 of the filter 1 is fixed to a housing, the straight lines R, S and T of the flat plate member 2 function just like a framework (beams) crossing on the inner side of the flange portion 2e. Consequently, the strength of the flat plate member 2 is ensured, thus suppressing deformation of the flat plate member 2 caused by fluid passing through.

Next, a manufacturing facility for the filter 1 and a method for manufacturing the filter 1 using such a facility will be briefly explained referring to FIGS. 3A and 3B.

A filter manufacturing facility 20 is equipped with a horizontal conveyor (not shown in the drawings) on which a plurality of forming dies 22 (only one die is shown in FIG. 3) are arranged in sequence. The forming die 22 has a forming surface 22f whose shape is identical to that of the face of one side of the filter 1, i.e. the face of one side of the flat plate member 2 and bag-like member 3, and is made of permeable meshed metal.

A spinning nozzle 24 is provided at a predetermined height above the conveyor. The spinning nozzle 24 is, for example, a nozzle that utilizes a melt-blow method and ejects to the forming surface 22f of the forming die 22 a fiber resin M (hereinafter referred to as the fibers M) ejected from an extruder not shown in the drawings. The fibers M ejected from the spinning nozzle 24, which are in semi-molten state, are laminated over the forming surface 22f to be fused together forming nonwoven fabric. Also, a nozzle utilizing a spin-bonding method may be used as the spinning nozzle 24.

Next, a manufacturing method of the filter 1 will be described.

First, the forming die 22 moves in the Y direction. When a tip of the forming die 22 (the left end in FIG. 3A) reaches a location directly below the spinning nozzle 24, the semi-molten fibers M ejected from the spinning nozzle 24 are laminated over the forming surface 22f of the forming die 22. At this time, since the forming die 22 travels in the Y direction with respect to the spinning nozzle 24 at a constant speed, as shown in FIG. 3A, a constant thickness of the semi-molten fibers M is laminated over the forming surface 22f of the forming die 22 in sequence starting from the tip side. Thus laminated fibers M are fused together where they contact each other, forming nonwoven fabric. That is, the nonwoven fabric is formed in a shape of the filter 1 by the forming die 22.

As stated above, with the manufacturing method comprising the steps of preparing the forming die 22 having the forming surface 22f formed in a shape almost identical to that of one side of the filter 1, and laminating the fibers over the forming surface 22f of the forming die 22, the manufacturing efficiency of the filter 1 is improved.

The manufacturing method of the filter 1 mentioned above facilitates the manufacturing of the filter 1.

According to this embodiment, the bag-like members 3 of the filter 1 stated above are all disposed with intervals therebetween, and the peripheries of the openings 3m of respective bag-like members 3 are supported by the flat plate member 2. In other words, each of the bag-like members 3 is supported from the periphery by the flat plate member 2 at the position of the opening 3m.

Furthermore, the bag-like member 3 is formed such that the centerline thereof is orthogonal to the opening 3m and the shape of the section parallel to the opening 3m forms a circle. Accordingly, the bag-like member 3 does not easily deform due to fluid passing therethrough, thereby suppressing a filtering efficiency drop caused by adhesion of adjacent bag-like members 3.

Also, on the flat plate member 2 exist a plurality of straight lines R, S and T that traverse the flat plate member 2 without interfering with any of the bag-like members 3, and each straight line R, S and T intersects with the other straight lines in at least one place each. Because the straight lines that are fixed at both ends do not easily deform due to outer force, when the flange portion 2e of the filter 1 is fixed to a housing, the straight lines R, S and T on the flat plate member 2 of the filter 1 function just like the framework (beams) crossing on the inner side of the flange portion 2e. As a result, the strength of the flat member 2 is ensured and deformation thereof can be suppressed.

The filter 1 according to this embodiment is an example in which the flat plate member 2 is formed in a rectangular shape, however, the shape of the flat plate member 2 may be changed appropriately according to the shape of the section of the housing to which the corresponding filter 1 is fitted. Also, although the example shows the bag-like member 3 formed in a tapered cylindrical shape, the shape of the bag-like member 3 can be a polyangular cylindrical, conical, polyangular conical, or semispherical shape. Furthermore, the number of the bag-like members 3 connected to the flat plate member 2 may be changed appropriately according to the size of the filter 1.

The embodiment also shows an example in which the semi-molten fibers M are ejected from the spinning nozzle 24 and laminated over the forming surface 22f of the forming die 22, but a method in which fibers are laminated over the forming surface 22f of the forming die 22 based on the principle of paper milling may also be used.

Further, although the embodiment shows an example of the filter in which single-layer nonwoven fabric is used, the nonwoven fabric used for the filter can also be double-layer or triple-layer fabric.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A manufacturing method of a filter having a filter portion with a plurality of bag-like members, each bag-like member having a container shape and each bag-like member having an opening that is disposed a predetermined distance away from another opening, and a supporting member which supports a periphery of the opening of the bag-like members and connects each of the bag-like members, comprising:

preparing a forming die provided with a forming surface which is formed in a shape corresponding to that of one side of the filter; and laminating fibers over the forming surface of the forming die, wherein the forming die is a permeable meshed die, the fibers are semi-molten when laminated over the forming surface of the die, the container shape includes at least one of a conical shape, polyangular conical shape, semispherical shape and a conical trapezoid shape.

2. The method according to claim 1, wherein the forming die is made of permeable meshed metal.

3. The method according to claim 1, further comprising moving the forming die at a constant speed with respect to a nozzle during the laminating step.

4. The method according to claim 1, wherein the fibers are laminated using a melt-blow method.

5. The method according to claim 1, wherein the fibers are laminated at a constant thickness over the forming die.

6. The method according to claim 1, wherein the bag-like members are formed such that a center line thereof is orthogonal to the opening and a section parallel to the opening is circular or polygonal in shape and the supporting member has, on a plane surface of the supporting member, a plurality of straight portions that traverse the supporting member without interfering with any of the bag-like members with each straight portion intersecting with the other straight portions in at least one place each.

7. A filter manufactured according to claim 1.

* * * * *